Patented July 18, 1933

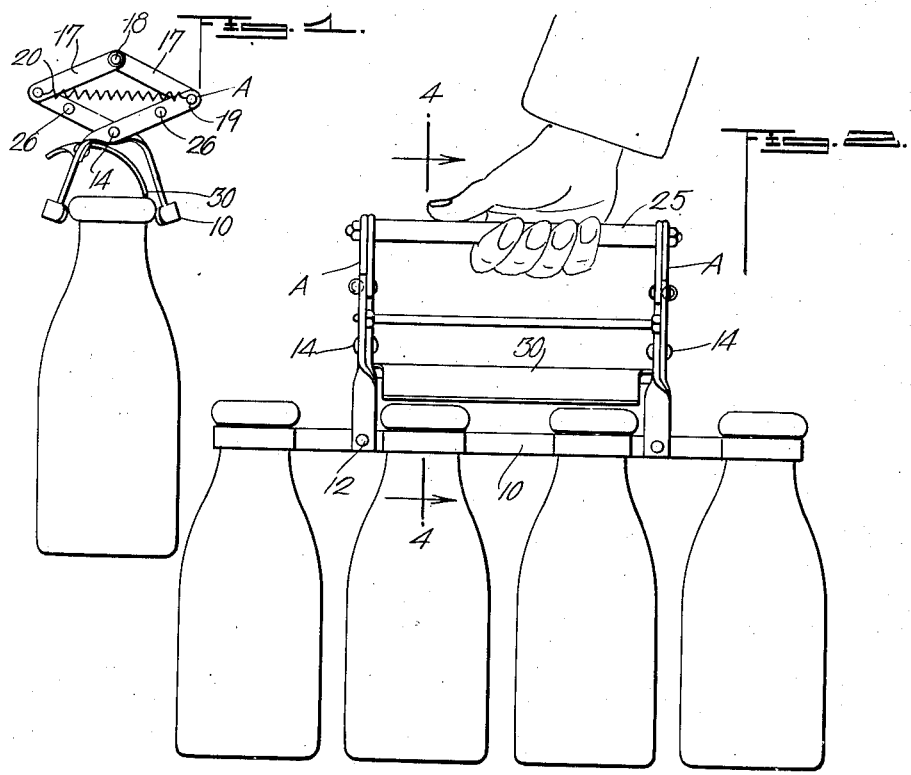

1,918,486

UNITED STATES PATENT OFFICE

ABRAHAM ONOS, OF HAWTHORNE, NEW JERSEY

ARTICLE CARRIER

Application filed February 9, 1932. Serial No. 591,913.

The present invention relates to new and useful improvements in article carrying devices, and while the invention is herein illustrated as a device for supporting and carrying milk bottles, it is to be understood that the invention is applicable to other articles as well as milk bottles.

It is one of the objects of the invention to provide a new and novel means by which one or more milk bottles may be manipulated in the delivery of milk without necessitating the touching of the bottles by the hand of the person delivering the milk.

It is a further object of the invention to provide a new and novel structure by means of which the bottles will be firmly gripped and held without danger of dropping or damage to the bottles from other causes.

It is a further object of the invention so to construct and arrange the device that the same may be easily and readily attached to and detached with respect to the articles to be carried thereby.

Other objects of the invention will appear as the nature of the invention is better understood, and for the purpose of which reference will be had to the accompanying drawing, in which:—

Figure 1 is a view in end elevation showing the device in the act of gripping the neck of a milk bottle, Figure 2 is a side elevational view on an enlarged scale showing a plurality of milk bottles carried by the member, Figure 3 is a bottom plan view, Figure 4 is a detail sectional view taken on the line 4—4 of Figure 2, and Figure 5 is a view in end elevation showing a milk bottle firmly held by the device.

In the present embodiment of the invention, the device comprises two article gripping or clamping jaws 10. These jaws are provided with curved portions 11 which more or less conform to the shape of the article to be grasped thereby. The reference character A designates two toggle members and these toggle members are rigidly connected as at 12 to the jaws 10. The toggle members each comprise two crossed levers 13 which are pivotally connected together intermediate their ends as at 14. Pivotally connected to the upper ends of the levers 13 of each toggle member A are a pair of links 17, which links are pivotally connected together as at 18. The pivotal connection between the links 17 and the levers 13 is designated 19 and connecting these pivotal connections, there is a tension spring 20 which tends to rock the levers 13 about their pivotal points 14 in order to cause the jaws 10 to normally engage the articles to be gripped thereby.

The toggle members A are spaced with respect to each other and are connected by means of a handle or the like 25 the ends of which form the pivotal connections 18 between the links 17. Carried by each of the levers 13 and connected to the corresponding lever in the opposite toggle member A, there is a rod 26. These rods 26 are spaced with respect to each other and also with respect to the handle 25 but they are sufficiently close to the handle 25 that they may be grasped by a person gripping the handle 25 as will be hereinafter described.

The reference numeral 30 designates a protecting shield which is preferably curved in cross sectional form as best illustrated in Figures 1, 4 and 5. This shield consists of a body portion which is long enough to extend from one of the toggle members A to the other toggle member, and which is wide enough to extend beyond the edges of the articles carried, as best illustrated in Figure 4. This member is secured to corresponding levers 13 of the toggle members A as by rivets or the like 33, but other fastening means may be employed if desired.

The device operates in the following manner. The springs 20 tend to pull the members of the toggles together and thus maintain the gripping jaws 10 normally in gripping position. To grip a plurality of articles such for example as milk bottles, the operator grasps the handle 25 and with his fingers encircles one of the rods 26. Pressure applied will spread the toggle members A and cause the gripping jaws 10 to open. After this has been done, the device is inserted over the milk bottle and the rod 26 released. When the rod 26 is released, the spring 20 serves to pull the toggle members together and cause the gripping jaws 10 to firmly grip the bottle. If now the device be lifted by the handle 25, the weight of the articles will also cause the toggles to operate in such a manner as to cause a firm grip of the gripping jaws 10 around the articles to be carried by the device.

From the foregoing it will be apparent that the present invention provides new and improved device for gripping and transporting one or more articles without necessitating the grasping of the articles by the person carrying the same, thus providing a highly sanitary and efficient device for the purpose intended.

While the invention has been herein illustrated in what may be termed a preferred form, it is to be understood that the invention is not to be limited to the specific constructions herein shown, but that it may be carried out in other forms without departing from the spirit thereof.

Having thus described the invention, what I claim as new and desire to secure by Letters Patent is:—

1. A device of the character described comprising a pair of article gripping jaws, a pair of spaced toggle members carried by the jaws, a handle member carried by the toggle members, and an article protecting shield carried by the toggle members and interposed between the article gripping jaws and the handle.

2. A device of the character described comprising a pair of article gripping jaws, a pair of spaced toggle members carried by the jaws, a handle member carried by the toggle members, and an article protecting shield carried by the toggle members and interposed between the article gripping jaws and the handle, said article protecting shield extending throughout the space between the toggle members, and of sufficient width to cover the article gripping jaws when in operative position.

ABRAHAM ONOS.